(12) United States Patent
Li

(10) Patent No.: US 11,062,308 B2
(45) Date of Patent: Jul. 13, 2021

(54) SERVICE EXECUTION RESULT OBTAINING METHOD AND SYSTEM BASED ON BLOCKCHAIN

(71) Applicant: Advanced New Technologies Co., Ltd., Grand Cayman (KY)

(72) Inventor: Yanpeng Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/814,848

(22) Filed: Mar. 10, 2020

(65) Prior Publication Data

US 2020/0211001 A1    Jul. 2, 2020

Related U.S. Application Data

(63) Continuation of application No. PCT/CN2020/070966, filed on Jan. 8, 2020.

(30) Foreign Application Priority Data

Apr. 23, 2019 (CN) .......................... 201910327484.3

(51) Int. Cl.
*G06Q 20/38* (2012.01)
*G06Q 20/40* (2012.01)
*H04L 9/06* (2006.01)

(52) U.S. Cl.
CPC ......... *G06Q 20/389* (2013.01); *G06Q 20/401* (2013.01); *H04L 9/0643* (2013.01); *H04L 2209/38* (2013.01)

(58) Field of Classification Search
CPC . H04L 9/0643; H04L 2209/38; H04L 9/3239; G06Q 2220/00; G06Q 20/401; G06Q 20/02; G06Q 20/389

See application file for complete search history.

(56) References Cited

U.S. PATENT DOCUMENTS 10,445,571 B1 * 10/2019 Gaeta ................. G06K 9/00469
2011/0131277 A1 * 6/2011 Niemoeller ........... H04M 15/00
709/204

(Continued)

FOREIGN PATENT DOCUMENTS

| CN | 106296137 | 1/2017 |
| CN | 107451812 | 12/2017 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Scott S Trotter

(74) *Attorney, Agent, or Firm* — Fish & Richardson P.C.

(57) ABSTRACT

Computer-implemented methods, non-transitory, computer-readable media, and computer-implemented systems for obtaining a service execution result based on a blockchain. A direct service provider device accepts a service, and submits the service to an indirect service provider device for execution. The indirect service provider device can encapsulate a service execution result obtained by executing the service into a blockchain transaction, and submit the blockchain transaction to a blockchain network for storage. The direct service provider device can obtain the service execution result from the blockchain network as a basis for performing a service-associated operation subsequently.

20 Claims, 4 Drawing Sheets

(56) References Cited

U.S. PATENT DOCUMENTS

2018/0293556 A1   10/2018  Hyun et al.
2018/0365686 A1   12/2018  Kondo
2019/0005469 A1*  1/2019  Dhupkar ................ G06Q 20/06

FOREIGN PATENT DOCUMENTS

| | | |
|---|---|---|
| CN | 107491948 | 12/2017 |
| CN | 107528822 | 12/2017 |
| CN | 108038786 | 5/2018 |
| CN | 108257000 | 7/2018 |
| CN | 108305170 | 7/2018 |
| CN | 108985752 | 12/2018 |
| CN | 109003175 | 12/2018 |
| CN | 109146337 | 1/2019 |
| CN | 110175915 | 8/2019 |
| TW | 201803634 | 2/2018 |

OTHER PUBLICATIONS

Nakamoto, "Bitcoin: A Peer-to-Peer Electronic Cash System," www.bitcoin.org, 2005, 9 pages.

International Search Report and Written Opinion in PCT Appln. No. PCT/CN2020/070966, dated Apr. 9, 2020, 10 pages (full machine translation).

Qi et al, "A Warehouse Receipt Management System Based on Blockchain Technology," in Journal of East China Normal University, Sep. 2018, 10 pages (with English abstract).

* cited by examiner

SERVICE EXECUTION RESULT OBTAINING METHOD AND SYSTEM BASED ON BLOCKCHAIN

CROSS-REFERENCE TO RELATED APPLICATIONS

This application is a continuation of PCT Application No. PCT/CN2020/070966, filed on Jan. 8, 2020, which claims priority to Chinese Patent Application No. 201910327484.3, filed on Apr. 23, 2019, and each application is hereby incorporated by reference in its entirety.

TECHNICAL FIELD

The present specification relates to the field of information technologies, and in particular, to service execution result obtaining methods and systems based on blockchain.

BACKGROUND

In a scenario in which a direct service provider and an indirect service provider are involved, a direct service provider device directly accepts a service for the user, submits the service to an indirect service provider device for execution, and the indirect service provider returns a determined service execution result to the direct service provider device. The direct service provider device further performs a service-associated operation based on the obtained service execution result.

Sometimes, a technical fault may occur to the indirect service provider device, and consequently the service execution result returned by the indirect service provider device is inaccurate, and then the direct service provider device performs an incorrect service-associated operation. Sometimes, the service execution result returned by the indirect service provider device is accurate, but a technical fault occurs to the direct service provider device, and then the direct service provider device performs an incorrect service-associated operation.

However, in practice, when the direct service provider device performs an incorrect service-associated operation, it is usually difficult to determine whether the incorrect service-associated operation is caused by a technical fault of the direct service provider or a technical fault of the indirect service provider.

SUMMARY

In order to alleviate the problem that the service execution result cannot be stored in the existing service execution result obtaining method, implementations of the present specification provide service execution result obtaining methods and systems based on blockchain. The technical solutions are as follows:

According to a first aspect of the implementations of the present specification, a service execution result obtaining method based on blockchain is provided, where the method is used to enable a direct service provider to obtain a service execution result returned by an indirect service provider, so that the direct service provider can perform a service-associated operation based on the service execution result; the service execution result is obtained after the direct service provider accepts a service initiated by a user, and submits the service to the indirect service provider for execution; and the direct service provider has registered a direct service provider account on a blockchain network, and the indirect service provider has registered an indirect service provider account on the blockchain network; and the method further includes: determining, by the indirect service provider device, the service execution result of the service; constructing, by the indirect service provider device, a result return transaction by using the indirect service provider account, and submitting the result return transaction to the blockchain network, where the result return transaction includes a service identifier of the service and the service execution result; triggering, by the blockchain network, a result return event based on the result return transaction, and writing the result return transaction to a blockchain; and after detecting, through monitoring, the result return event by using the direct service provider account, obtaining, by the direct service provider device, the result return transaction from the blockchain network by using the direct service provider account, and extracting the service execution result from the result return transaction.

According to a second aspect of the implementations of the present specification, a service execution result obtaining system based on blockchain is provided, where the system is configured to enable a direct service provider to obtain a service execution result returned by an indirect service provider, so that the direct service provider can perform a service-associated operation based on the service execution result; the service execution result is obtained after the direct service provider accepts a service initiated by a user, and submits the service to the indirect service provider for execution; and the direct service provider has registered a direct service provider account on a blockchain network, and the indirect service provider has registered an indirect service provider account on the blockchain network; and the system includes a blockchain network, a direct service provider device, and an indirect service provider device, where the indirect service provider device is configured to: determine the service execution result of the service; and construct a result return transaction by using the indirect service provider account, and submit the result return transaction to the blockchain network, where the result return transaction includes a service identifier of the service and the service execution result; the blockchain network is configured to trigger a result return event based on the result return transaction, and write the result return transaction to a blockchain; and the direct service provider device is configured to: after detecting, through monitoring, the result return event by using the direct service provider account, obtain the result return transaction from the blockchain network by using the direct service provider account, and extract the service execution result from the result return transaction.

According to the technical solutions provided in the implementations of the present specification, the direct service provider device accepts a service, and submits the service to the indirect service provider device for execution. The indirect service provider device can encapsulate a service execution result obtained by executing the service into a blockchain transaction, and submit the blockchain transaction to a blockchain network for storage; and the direct service provider device can obtain the service execution result from the blockchain network as a basis for performing a service-associated operation subsequently. As such, the service execution result returned by the indirect service provider device to the direct service provider device will be stored in the blockchain, which is difficult to tamper with and therefore trustworthy. When the direct service provider device performs an incorrect service-associated operation, the service execution result stored in the blockchain can be used as an evidence to determine whether the incorrect service-associated operation is caused by the technical fault of the direct service provider device or by the technical fault of the indirect service provider device.

It should be understood that the previous general descriptions and the following detailed descriptions are merely illustrative and explanatory, and do not limit the implementations of the present specification.

In addition, any one of the implementations of the present specification does not need to achieve all the effects described above.

BRIEF DESCRIPTION OF DRAWINGS

To describe the technical solutions in the implementations of the present specification or in the existing technology more clearly, the following outlines the accompanying drawings for illustrating such technical solutions. Clearly, the accompanying drawings outlined below are some implementations of the present specification and a person skilled in the art can derive other drawings from such accompanying drawings without creative efforts.

DESCRIPTION OF IMPLEMENTATIONS

Figure 1:
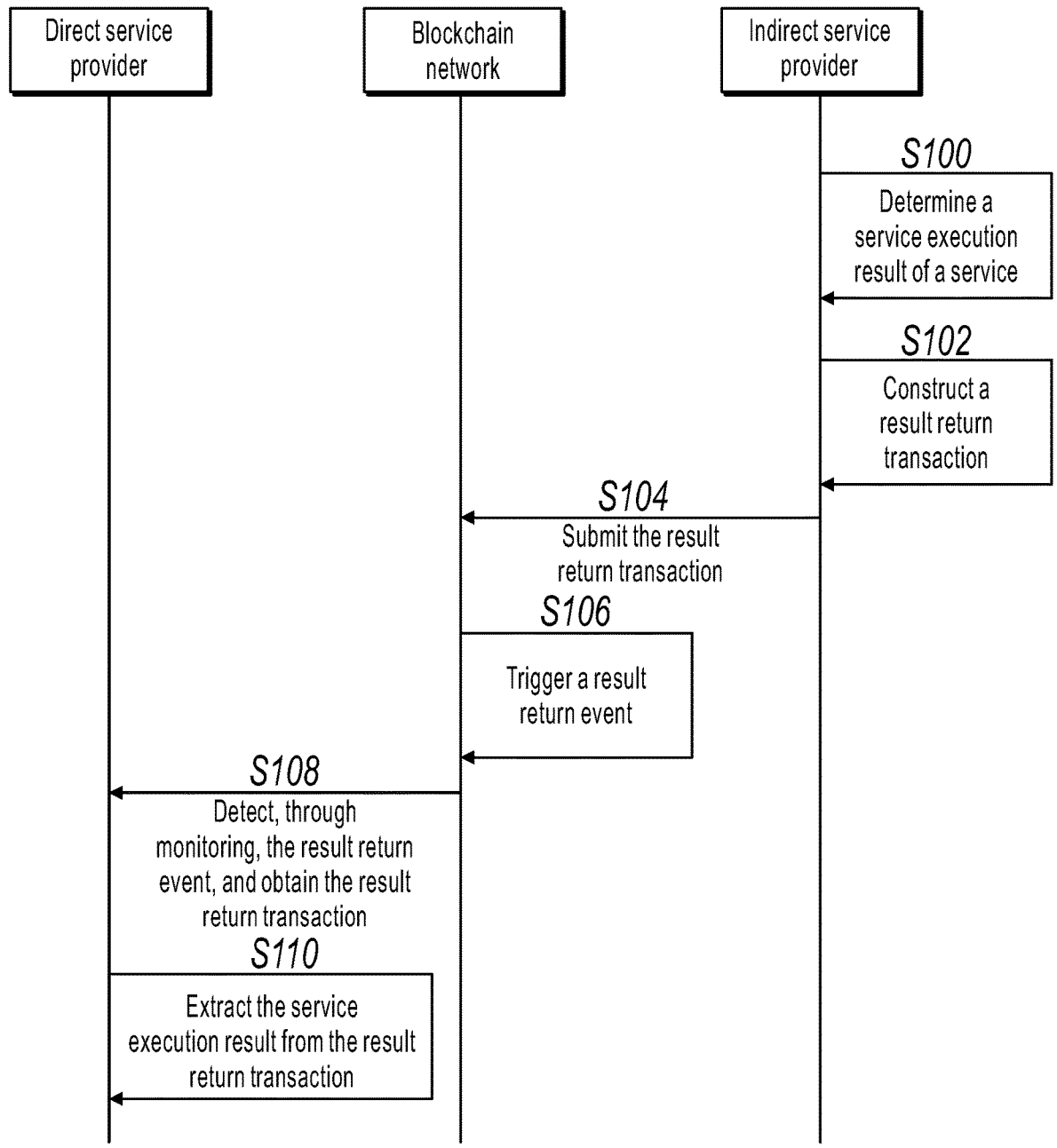
FIG. 1 is a schematic flowchart illustrating a service execution result obtaining method based on blockchain, according to an implementation of the present specification.

The scenario in which a direct service provider and an indirect service provider are involved and that is described in the present specification is common in practice.

For example, the direct service provider can be a ticket platform, and the indirect service provider can be airline company A. Users can purchase tickets of airline company A on the ticket platform. After a user initiates a ticket purchasing request to a server of the ticket platform (airline company A is selected), the server of the ticket platform submits the ticket purchasing request to the server of airline company A, and then a server of airline company A attempts to issue a ticket. If the ticket is issued successfully, the server of airline company A returns, to the ticket platform, a service execution result indicating that the ticket is issued successfully; or if the ticket fails to be issued, the server of air company A returns, to the ticket platform, a service execution result indicating that the ticket fails to be issued. If the server of the ticket platform receives the service execution result that indicates that the ticket is issued successfully and that is returned by air company A, the server of the ticket platform performs a service-associated operation, that is, collects money from an account of the user; if the server of the ticket platform receives the service execution result that indicates that the ticket failed to be issued and that is returned by air company A, the server of the ticket platform performs a service-associated operation, that is, recommends a ticket of another airline company to the user.

For another example, the direct service provider can be a payment platform, the indirect service provider can be bank B, and an account number of a user on the payment platform is bound to an account of the user in bank B. When the user transfers money through the payment platform, the payment platform submits the transfer service to bank B for processing. If bank B transfers the money successfully, bank B returns, to the payment platform, a service execution result indicating that the money is transferred successfully; or if bank B fails to transfer the money, bank B returns, to the payment platform, a service execution result indicating that the money fails to be transferred. If the payment platform receives the transfer success result returned by bank B, the payment platform sends a transfer success notification message to the user; or if the payment platform receives the transfer failure result returned by bank B, the payment platform sends a transfer failure notification message to the user.

Obviously, in the previous scenario, if the result returned by the indirect service provider to the direct service provider is inaccurate (inconsistent with the actual situation), the service-associated operation performed by the direct service provider will cause trouble to the user or the direct service provider. In addition, even if the service execution result returned by the indirect service provider is accurate, the direct service provider may still perform an incorrect service-associated operation when a technical fault occurs.

In the first example described above, assume that the server of airline company A succeeds in issuing a ticket, but due to a technical fault, still returns, to the ticket platform, a service execution result indicating that the ticket fails to be issued. Consequently, the ticket platform mistakenly considers that the ticket is not issued and does not collect money from the user, resulting in a loss to the platform (the user succeeds in taking the flight without paying money for the ticket, but the platform still needs to pay money to the air company for the ticket).

In the second example described above, assume that bank B transfers money successfully and returns, to the payment platform, a service execution result indicating that the money is transferred successfully, but the server of the payment platform returns a transfer failure notification message to the user due to a technical fault. This can bring inconvenience to the user (the money is actually transferred from the user's account in bank B).

When the above mentioned service failure occurs, the direct service provider and the indirect service provider often dispute the liability for the service failure. However, currently, there is no way to prove which technical fault causes the service failure.

For this reason, in one or more implementations of the present specification, a service execution result returned by an indirect service provider to a direct service provider is stored in a blockchain. As such, it cannot be tampered with and is therefore trustworthy. In addition, the direct service provider obtains the service execution result from the blockchain to perform the service-associated operation. Therefore, when the above-mentioned service failure occurs, because the service execution result accepted by both the direct service provider and the indirect service provider can be obtained from the blockchain, the technical fault that causes the service failure can be clearly determined.

For example, in the first example described above, if airline company A issues the ticket successfully and returns the service execution result indicating that the ticket is issued successfully, and the service execution result is stored in the blockchain, but the server of the ticket platform notifies the user that the ticket fails to be issued and does not collect money from the user, based on the service execution result stored in the blockchain, it can be determined that a technical fault occurs to the ticket platform and the ticket platform should be held liable.

For another example, in the second example described above, if bank B transfers the money successfully but returns the service execution result indicating that the money fails to be transferred, and the service execution result is stored in the blockchain. In this case, the server of the payment platform sends, to the user, a notification message indicating that the money fails to be transferred, and based on the service execution result stored in the blockchain, it can be determined that a technical fault occurs to bank B and bank B should be held liable.

To make a person skilled in the art better understand the technical solutions in the present specification, the following describes the technical solutions in the implementations of the present specification in detail with reference to the accompanying drawings in the implementations of the present specification. Clearly, the described implementations are merely some but not all of the implementations of the present specification. Other implementations obtained by a person of ordinary skill in the art based on the implementations of the present specification shall within the scope of the present specification.

The following describes in detail the implementations of the present specification.

FIG. 1 is a schematic flowchart illustrating a service execution result obtaining method based on blockchain, according to an implementation of the present specification.

S100: An indirect service provider device determines a service execution result of a service.

The application scenario of this method is: A direct service provider accepts a service initiated by a user and submits the service to an indirect service provider for execution, and then the direct service provider needs to obtain a service execution result from the indirect service provider as a basis for performing a service-associated operation.

The direct service provider provides the service directly to the user and is responsible to the user. However, the direct service provider needs to transfer the service initiated by the user to the indirect service provider for execution, and perform a service-associated operation (for example, feeding back the service execution state to the user, charging the user, and users, charging the user, or granting an award to the user) based on a service execution result fed back by the indirect service provider.

In this implementation of the present specification, the direct service provider indirectly obtains the service execution result returned by the indirect service provider through the blockchain network. In addition to the service execution result, the entire process in which the direct service provider obtains the service execution result returned by the indirect service provider is also stored in the blockchain. In addition, the direct service provider and the indirect service provider each need to register a blockchain account on the blockchain network in advance to obtain a block user identity. For ease of description, in the present specification, the blockchain account registered by the direct service provider referred to as the direct service provider account, and the blockchain account registered by the indirect service provider is referred to as the indirect service provider account.

Service providers (both the direct service provider and the indirect service provider) interact with the blockchain network through their respective service provider accounts registered with the blockchain network. A service provider needs to install a blockchain client on a device of the service provider and log in to the service provider account on the blockchain client before the service provider can use services of the blockchain network.

In this implementation of the present specification, the direct service provider device is a device of a direct service provider, for example, a server of the direct service provider. The indirect service provider device is a device of the indirect service provider, for example, a server of the indirect service provider. A direct service provider account can be logged in from the direct service provider device, or can be logged in from another device connected to the direct service provider device. An indirect service provider account can be logged in from the indirect service provider device, or can be logged in from another device connected to the direct service provider device.

In addition, it is worthwhile to note that nodes in the blockchain network can include nodes managed by the direct service provider and nodes managed by the indirect service provider. For example, the direct service provider device can be a node in the blockchain network, and the indirect service provider device can also be a node in the blockchain network.

In step S100, the indirect service provider can determine the service execution result of the service after executing the service, and start to return the service execution result. The indirect service provider can also store the service execution result after executing the service and obtaining the service execution result, and then invoke the service execution result from the storage device and start to return the service execution result.

S102: The indirect service provider device constructs a result return transaction by using the indirect service provider account.

S104: The indirect service provider device submits the result return transaction to the blockchain network.

When an indirect service provider needs to return the service execution result, the indirect service provider can construct a result return transaction that includes a service identifier of the service and the service execution result.

It is worthwhile to note that in practice, the indirect service provider usually process more than one service from a direct service provider. Different services need to be differentiated by service identifiers. Therefore, the service identifier of the service corresponding to the service execution result needs to be written to the result return transaction, to indicate that the service execution result carried in the result return transaction execution result is the service execution result of the service identified by the service identifier.

S106: The blockchain network triggers a result return event based on the result return transaction, and writes the result return transaction to a blockchain.

In this implementation of the present specification, a smart contract used for implementing this method is pre-deployed in the blockchain network. When obtaining the result return transaction, each node in the blockchain network triggers a result return event by using the event mechanism of the smart contract, where the result return event indicates that the indirect service provider has returned the service execution result corresponding to the service identifier.

In addition, each node in the blockchain networks writes the result return transaction to its blockchain for storage.

S108: After detecting, through monitoring, the result return event by using the direct service provider account, the direct service provider device obtains the result return transaction from the blockchain network by using the direct service provider account.

S110: The direct service provider device extracts the service execution result from the result return transaction.

When the result return event triggered by the smart contract in the blockchain network is detected, through monitoring, by the direct service provider account, the direct service provider account can obtain the result return transaction from the blockchain network, and then extract the service execution result as a basis for performing a service-associated operation.

In addition, in this implementation of the present specification, after obtaining a service execution result by executing a service, the indirect service provider may not actively return the service execution result, and the direct service provider may request to obtain the service execution result.

Specifically, before step S100, the direct service provider device can construct a result acquisition transaction by using the direct service provider account, and submit the result acquisition transaction to the blockchain network, where the result acquisition transaction includes a service identifier of the transaction. Then, the blockchain network triggers a result acquisition event based on the result acquisition transaction, and writes the result acquisition transaction to the blockchain.

Figure 2:
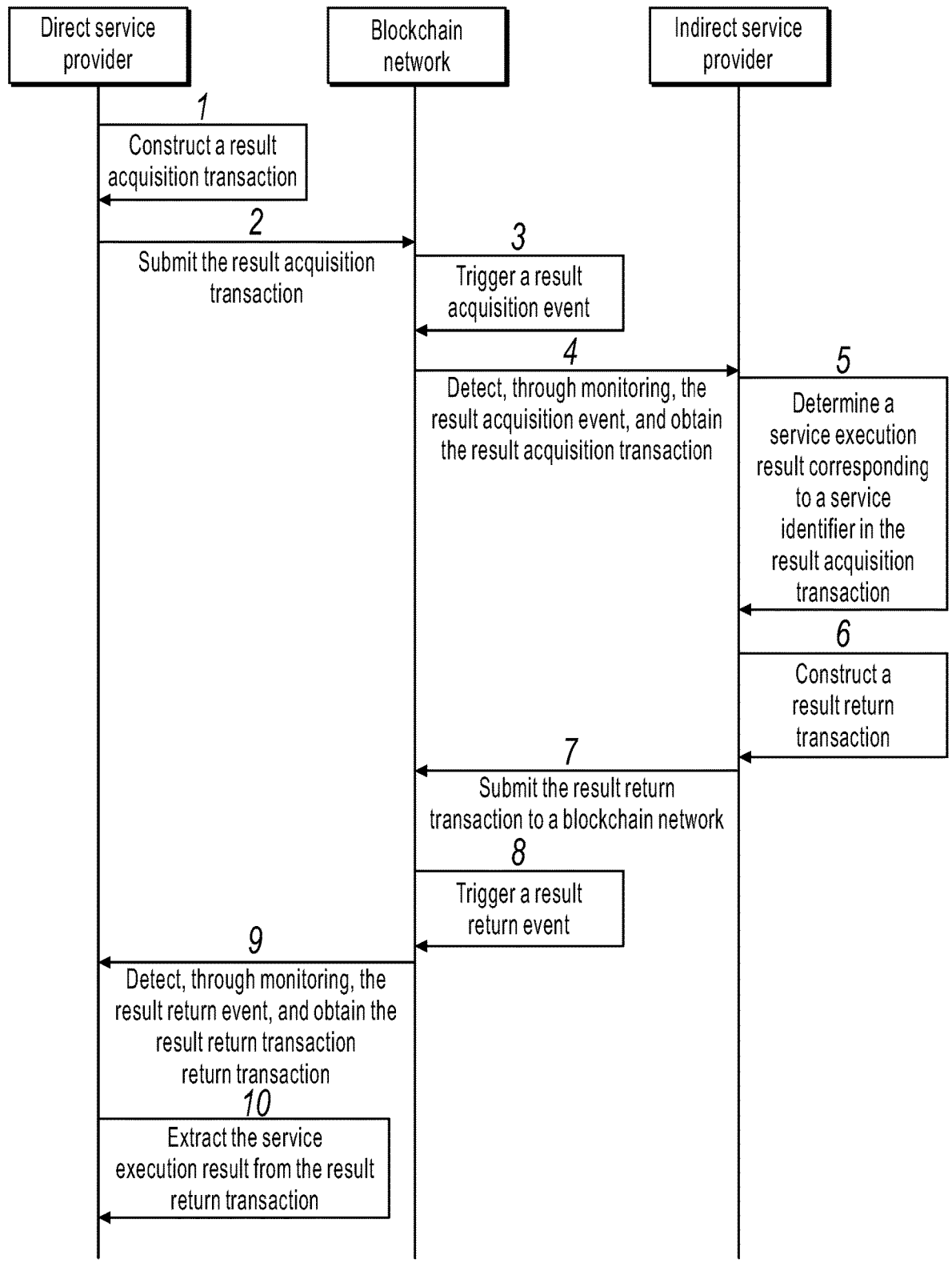
FIG. 2 is a schematic flowchart illustrating a service execution result obtaining method based on blockchain, according to an implementation of the present specification.

As such, in step S100, after detecting, through monitoring, the result acquisition event by using the indirect service provider account, the indirect service provider device can obtain the result acquisition transaction from the blockchain network by using the indirect service provider account; extract the service identifier from the result acquisition transaction; and then determine the service execution result of the service based on the service identifier (for example, reading the service execution result corresponding to the service identifier from the storage device). For details, references can be made to FIG. 2.

Further, in this implementation of the specification, before triggering the result acquisition event, the blockchain network assigns a first status flag to the result acquisition transaction, and then writes the first status flag assigned to the result acquisition transaction to the blockchain. The first status flag indicates that the indirect service provider device does not return the service execution result.

Before triggering the result return event, the blockchain network assigns a second status flag to the result return transaction, and writes the second status flag assigned to the result return transaction to the blockchain. The second status flag indicates that the indirect service provider device has returned the service execution result.

In addition, after obtaining the service execution result in the result return transaction, the direct service provider device constructs a confirmation transaction by using the direct service provider account, and submits the confirmation transaction to the blockchain network, where the confirmation transaction includes the service identifier; and then the blockchain network assigns a third status flag to the confirmation transaction, and writes, by the blockchain network, the third status flag assigned to the confirmation transaction to the blockchain. The third status flag indicates that the direct service provider device has obtained the service execution result.

The first status flag, the second status flag, and the third status flag are used to record the progress status of the entire process in which the direct service provider obtains the service execution result, and are used for subsequent verification.

An implementation of the present specification further provides a service execution result obtaining system based on blockchain, where the system is configured to enable a direct service provider to obtain a service execution result returned by an indirect service provider, so that the direct service provider can perform a service-associated operation based on the service execution result; the service execution result is obtained after the direct service provider accepts a service initiated by a user and submits the service to the indirect service provider for execution; and the direct service provider has registered a direct service provider account on a blockchain network, and the indirect service provider has registered an indirect service provider account on the blockchain network; and the system includes a blockchain network, a direct service provider device, and an indirect service provider device, where the indirect service provider device is configured to: determine the service execution result of the service; and construct a result return transaction by using the indirect service provider account, and submit the result return transaction to the blockchain network, where the result return transaction includes a service identifier of the service and the service execution result; the blockchain network is configured to trigger a result return event based on the result return transaction, and write the result return transaction to a blockchain; and the direct service provider device is configured to: after detecting, through monitoring, the result return event by using the direct service provider account, obtain the result return transaction from the blockchain network by using the direct service provider account, and extract the service execution result from the result return transaction.

Figure 3:
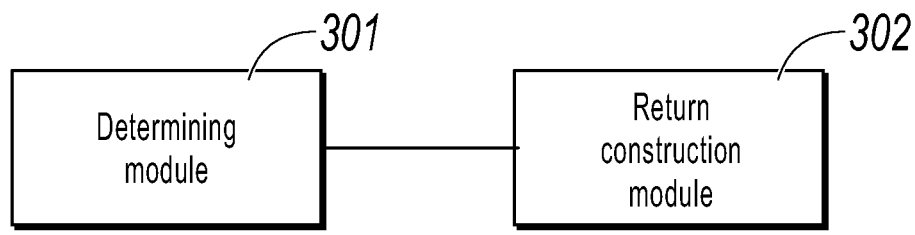
FIG. 3 is a schematic structural diagram illustrating an indirect service provider device, according to an implementation of the present specification.

FIG. 3 is a schematic structural diagram illustrating an indirect service provider device, according to an implementation of the present specification. The indirect service provider device is configured to enable a direct service provider to obtain a service execution result returned by an indirect service provider, so that the direct service provider can perform a service-associated operation based on the service execution result; the service execution result is obtained after the direct service provider accepts a service initiated by a user and submits the service to the indirect service provider for execution; and the direct service provider has registered a direct service provider account on a blockchain network, and the indirect service provider has registered an indirect service provider account on the blockchain network; and the indirect service provider device includes: a determining module 301, configured to determine the service execution result of the service; and a return construction module 302, configured to construct a result return transaction by using the indirect service provider account, and submit the result return transaction to the blockchain network, where the result return transaction includes a service identifier of the service and the service execution result.

Figure 4:
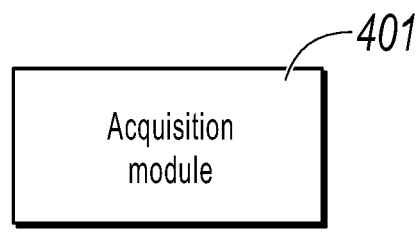
FIG. 4 is a schematic structural diagram illustrating a direct service provider device, according to an implementation of the present specification.

FIG. 4 is a schematic structural diagram illustrating a direct service provider device, according to an implementation of the present specification. The direct service provider device is configured to enable a direct service provider to obtain a service execution result returned by an indirect service provider, so that the direct service provider can perform a service-associated operation based on the service execution result; the service execution result is obtained after the direct service provider accepts a service initiated by a user and submits the service to the indirect service provider for execution; and the direct service provider has registered a direct service provider account on a blockchain network, and the indirect service provider has registered an indirect service provider account on the blockchain network; and the direct service provider device includes: an acquisition module 401, configured to: after detecting, through monitoring, the result return event by using the direct service provider account, obtain a result return transaction from the blockchain network by using the direct service provider account, and extract the service execution result from the result return transaction, where the result return event is triggered by the blockchain network based on the result return transaction; the result return transaction is constructed by the indirect service provider device by using the indirect service provider account; and the result return transaction includes a service identifier of the service and the service execution result; and the service execution result is determined by the indirect service provider device.

Figure 5:
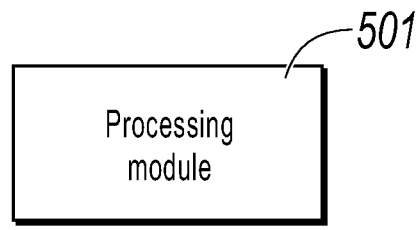
FIG. 5 is a schematic structural diagram illustrating a blockchain network node, according to an implementation of the present specification.

FIG. 5 is a schematic structural diagram illustrating a blockchain network node, according to an implementation of the present specification. The blockchain network node is configured to enable a direct service provider to obtain a service execution result returned by an indirect service provider, so that the direct service provider can perform a service-associated operation based on the service execution result; the service execution result is obtained after the direct service provider accepts a service initiated by a user and submits the service to the indirect service provider for execution; and the direct service provider has registered a direct service provider account on a blockchain network, and the indirect service provider has registered an indirect service provider account on the blockchain network; and the node includes: a processing module 501, configured to trigger a result return event based on a result return transaction, and write the result return transaction to the blockchain, where the result return transaction is constructed by the indirect service provider device by using the indirect service provider account; the result return transaction includes a service identifier of the service and the service execution result; and the service execution result is determined by the indirect service provider device.

An implementation of the present specification further provides a computer device, including at least a memory, a processor, and a computer program that is stored in the memory and can be run on the processor, where when the processor executes the computer program, the method shown in FIG. 1 is implemented.

Figure 6:
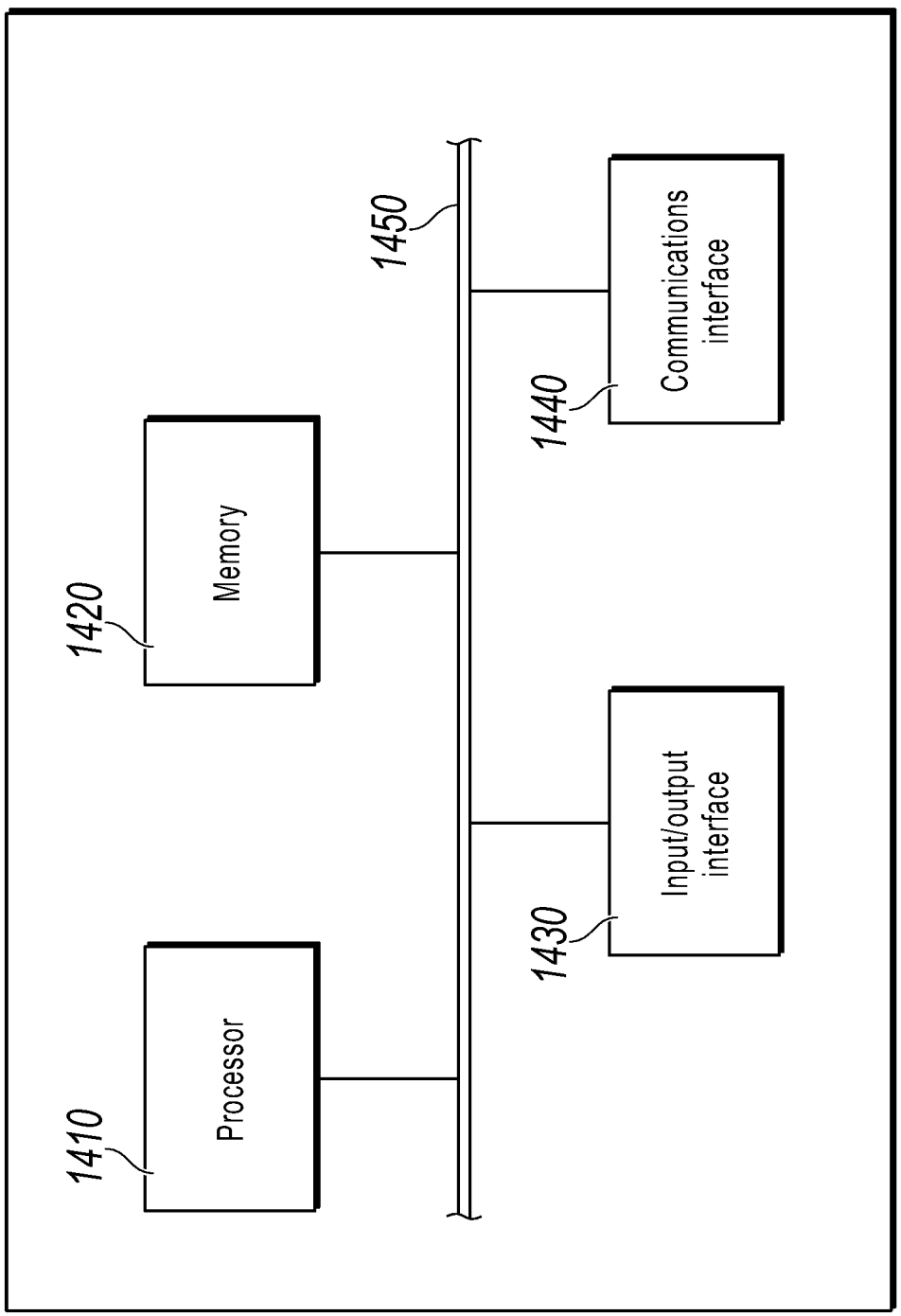
FIG. 6 is a schematic structural diagram illustrating a computer device, according to an implementation of the present specification.

FIG. 6 is a more detailed schematic structural diagram of a computing device, according to an implementation of the present specification. The device can include a processor 1410, a memory 1420, an input/output interface 1430, a communications interface 1440, and a bus 1450. The processor 1410, the memory 1420, the input/output interface 1430 and the communications interface 1440 implement the communication connection between each other within the device by using the bus 1450.

The processor 1410 can be implemented by using a general-purpose central processing unit (CPU), a microprocessor, an application-specific integrated circuit (ASIC), one or more integrated circuits, etc., and is configured to execute a related program to implement the technical solutions provided in the implementations of the specification.

The memory 1420 can be implemented as a ROM (Read Only Memory, read-only memory), a RAM (Random Access Memory, random access memory), a static storage device, a dynamic storage device, etc. The memory 1420 can store an operating system and other application programs. When the technical solutions provided in the implementations of the present specification are implemented by using software or firmware, associated program code is stored in the memory 1420 and is invoked and executed by the processor 1410.

The input/output interface 1430 is configured to connect an input/output module to input and output information. The input/output module can be configured as a component in a device (not shown) or externally connected to a device to provide corresponding functions. The input device can include a keyboard, a mouse, a touchscreen, a microphone, various sensors, etc. The output device can include a display, a speaker, a vibrator, an indicator lamp, etc.

The communications interface 1440 is configured to connect the communications module (not shown) to implement communication interaction between the device and other devices. The communications module can communicate in wired mode (for example, USB or a network cable) or wireless mode (for example, a mobile network, Wi-Fi, or Bluetooth).

The bus 1450 includes a channel for transmitting information between components of the device, such as the processor 1410, the memory 1420, the input/output interface 1430, and the communications interface 1440.

It is worthwhile to note that although only the processor 1410, the memory 1420, the input/output interface 1430, the communications interface 1440, and the bus 1450 are shown above, in a specific implementation process, the device can further include other components required for normal operation. In addition, a person skilled in the art understands that the devices described above may include only the components required for implementing the implementations of the present specification, rather than all the components shown in the figures.

An implementation of the present specification further provides a computer readable storage medium, where the medium stores a computer instruction, and when the computer instruction is executed by a processor, steps of the method shown in FIG. 1 are implemented.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible to a computing device. Based on the definition in the present specification, the computer readable medium does not include transitory media such as a modulated data signal and carrier.

It can be determined from the previous descriptions of implementations that a person skilled in the art can clearly understand that the implementations of the present specification can be implemented by software plus a necessary universal hardware platform. Based on such an understanding, the technical solutions of the implementations of the present specification essentially, or the contributing to the existing technology can be implemented in the form of a software product. The computer software product can be stored in the storage medium, such as the ROM/RAM, the magnetic disk, and the optical disc, and includes several instructions for enabling a computer device (which can be a personal computer, a server, or a network device) to perform all or some of the steps of the methods described in the implementations of the present specification.

The system, method, module, or unit illustrated in the previous implementations can be specifically implemented by using a computer chip or an entity, or can be implemented by using a product having a certain function. A typical implementation device is a computer in the form of a personal computer, a laptop computer, a cellular phone, a camera phone, a smart phone, a personal digital assistant, a media player, a navigation device, an e-mail transceiver, a game console, a tablet computer, a wearable device, or any combination of several of these devices.

It is worthwhile to note that the implementations of the present specification are described in a progressive way. For same or similar parts of the implementations, mutual references can be made to the implementations. Each implementation focuses on a difference from the other implementations. In particular, because the device implementation is basically similar to the method implementation, the description is relatively simple. For the related parts, references can be made to the description of the method implementation. The described device implementations are merely examples, the modules described as separate parts can or cannot be physically separate, and the functions of each module can be implemented in one or more pieces of software and/or hardware when the solutions in the implementations of the present specification are implemented. Based on the practical demands, some or all of the modules can be selected to achieve the objectives of the present implementation. A person of ordinary skill in the art can understand and implement the device without paying creative work.

The previous descriptions are merely specific implementations of the implementations of the present specification. It is worthwhile to note that a person of ordinary skill in the art can make some improvements and refinements without departing from the principles of the implementations of the present specification. These improvements and refinements shall also be considered as within protection scope of the implementations of the present specification.

What is claimed is:

1. A computer-implemented method for obtaining service execution result based on a blockchain, comprising:
    determining, by an indirect service provider device, a service execution result of a service initiated by a user, wherein the service is received by the indirect service provider device for execution from a direct service provider device that accepts the service, the direct service provider device registers a direct service provider account on a blockchain network, and the indirect service provider device registers an indirect service provider account on the blockchain network;
    constructing, by the indirect service provider device, a result return transaction using the indirect service provider account;
    submitting, by the indirect service provider device, the result return transaction to the blockchain network, wherein the result return transaction comprises a service identifier of the service and the service execution result, wherein the service execution result is to be returned to the direct service provider device for performing an operation associated with the service;
    triggering, by the blockchain network, a result return event based on the result return transaction, wherein the result return event indicates that the indirect service provider device has returned the service execution result corresponding to the service identifier;
    writing, by the blockchain network, the result return transaction to the blockchain, wherein the service execution result to be returned to the direct service provider device is stored in the blockchain network;
    monitoring, by the direct service provider device, a result return event using the direct service provider account;
    after detecting the result return event, obtaining, by the direct service provider device, the result return transaction from the blockchain network using the direct service provider account; and
    extracting, by the direct service provider device, the service execution result from the result return transaction.

2. The computer-implemented method according to claim 1, further comprising:
    before determining, by the indirect service provider device, the service execution result of the service:
        constructing, by the direct service provider device, a result acquisition transaction using the direct service provider account;
        submitting, by the direct service provider device, the result acquisition transaction to the blockchain network, wherein the result acquisition transaction comprises the service identifier of the service;
        triggering, by the blockchain network, a result acquisition event based on the result acquisition transaction; and
        writing, by the blockchain network, the result acquisition transaction to the blockchain.

3. The computer-implemented method according to claim 2, wherein determining, by the indirect service provider device, the service execution result of the service comprises:
    monitoring, by the indirect service provider device, the result acquisition event using the indirect service provider account;
    after detecting the result acquisition event, obtaining, by the indirect service provider device, the result acquisition transaction from the blockchain network using the indirect service provider account;
    extracting, by the indirect service provider device, the service identifier from the result acquisition transaction; and
    determining, by the indirect service provider device, the service execution result of the service based on the service identifier.

4. The computer-implemented method according to claim 2, further comprising:
    before triggering the result acquisition event, assigning, by the blockchain network, a first status flag to the result acquisition transaction, wherein the first status flag indicates that the indirect service provider device does not return the service execution result; and
    writing, by the blockchain network, the first status flag assigned to the result acquisition transaction to the blockchain.

5. The computer-implemented method according to claim 2, further comprising:
    before triggering the result return event, assigning, by the blockchain network, a second status flag to the result return transaction, wherein the second status flag indicates that the indirect service provider device has returned the service execution result; and writing, by the blockchain network, the second status flag assigned to the result return transaction to the blockchain.

6. The computer-implemented method according to claim 2, further comprising:

after obtaining the service execution result in the result return transaction:
constructing, by the direct service provider device, a confirmation transaction using the direct service provider account; and
submitting, by the direct service provider device, the confirmation transaction to the blockchain network, wherein the confirmation transaction comprises the service identifier.

7. The computer-implemented method according to claim 6, further comprising:

assigning, by the blockchain network, a third status flag to the confirmation transaction, wherein the third status flag indicates that the direct service provider device has obtained the service execution result; and
writing, by the blockchain network, the third status flag assigned to the confirmation transaction to the blockchain.

8. A non-transitory, computer-readable medium storing one or more instructions executable by a computer system to perform operations comprising:

determining, by an indirect service provider device, a service execution result of a service initiated by a user, wherein the service is received by the indirect service provider device for execution from a direct service provider device that accepts the service, the direct service provider device registers a direct service provider account on a blockchain network, and the indirect service provider device registers an indirect service provider account on the blockchain network;
constructing, by the indirect service provider device, a result return transaction using the indirect service provider account;
submitting, by the indirect service provider device, the result return transaction to the blockchain network, wherein the result return transaction comprises a service identifier of the service and the service execution result, wherein the service execution result is to be returned to the direct service provider device for performing an operation associated with the service;
triggering, by the blockchain network, a result return event based on the result return transaction, wherein the result return event indicates that the indirect service provider device has returned the service execution result corresponding to the service identifier;
writing, by the blockchain network, the result return transaction to a blockchain, wherein the service execution result to be returned to the direct service provider device is stored in the blockchain network;
monitoring, by the direct service provider device, a result return event using the direct service provider account;
after detecting the result return event, obtaining, by the direct service provider device, the result return transaction from the blockchain network using the direct service provider account; and
extracting, by the direct service provider device, the service execution result from the result return transaction.

9. The non-transitory, computer-readable medium according to claim 8, wherein the operations further comprises:

before determining, by the indirect service provider device, the service execution result of the service:
constructing, by the direct service provider device, a result acquisition transaction using the direct service provider account;
submitting, by the direct service provider device, the result acquisition transaction to the blockchain network, wherein the result acquisition transaction comprises the service identifier of the service;
triggering, by the blockchain network, a result acquisition event based on the result acquisition transaction; and
writing, by the blockchain network, the result acquisition transaction to the blockchain.

10. The non-transitory, computer-readable medium according to claim 9, wherein determining, by the indirect service provider device, the service execution result of the service comprises:

monitoring, by the indirect service provider device and using the indirect service provider account, the result acquisition event;
after detecting the result acquisition event, obtaining, by the indirect service provider device, the result acquisition transaction from the blockchain network using the indirect service provider account;
extracting, by the indirect service provider device, the service identifier from the result acquisition transaction; and
determining, by the indirect service provider device, the service execution result of the service based on the service identifier.

11. The non-transitory, computer-readable medium according to claim 9, wherein the operations further comprises:

before triggering the result acquisition event, assigning, by the blockchain network, a first status flag to the result acquisition transaction, wherein the first status flag indicates that the indirect service provider device does not return the service execution result; and
writing, by the blockchain network, the first status flag assigned to the result acquisition transaction to the blockchain.

12. The non-transitory, computer-readable medium according to claim 9, wherein the operations further comprises:

before triggering the result return event, assigning, by the blockchain network, a second status flag to the result return transaction, wherein the second status flag indicates that the indirect service provider device has returned the service execution result; and
writing, by the blockchain network, the second status flag assigned to the result return transaction to the blockchain.

13. The non-transitory, computer-readable medium according to claim 9, wherein the operations further comprises:

after obtaining the service execution result in the result return transaction:
constructing, by the direct service provider device, a confirmation transaction using the direct service provider account; and
submitting, by the direct service provider device, the confirmation transaction to the blockchain network, wherein the confirmation transaction comprises the service identifier.

14. The non-transitory, computer-readable medium according to claim 13, wherein the operations further comprises:
   assigning, by the blockchain network, a third status flag to the confirmation transaction, wherein the third status flag indicates that the direct service provider device has obtained the service execution result; and
   writing, by the blockchain network, the third status flag assigned to the confirmation transaction to the blockchain.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
   determining, by an indirect service provider device, a service execution result of a service initiated by a user, wherein the service is received by the indirect service provider device for execution from a direct service provider device that accepts the service, the direct service provider device registers a direct service provider account on a blockchain network, and the indirect service provider device registers an indirect service provider account on the blockchain network;
   constructing, by the indirect service provider device, a result return transaction using the indirect service provider account;
   submitting, by the indirect service provider device, the result return transaction to the blockchain network, wherein the result return transaction comprises a service identifier of the service and the service execution result, wherein the service execution result is to be returned to the direct service provider device for performing an operation associated with the service;
   triggering, by the blockchain network, a result return event based on the result return transaction, wherein the result return event indicates that the indirect service provider device has returned the service execution result corresponding to the service identifier;
   writing, by the blockchain network, the result return transaction to a blockchain, wherein the service execution result to be returned to the direct service provider device is stored in the blockchain network;
   monitoring, by the direct service provider device, a result return event using the direct service provider account;
   after detecting the result return event, obtaining, by the direct service provider device, the result return transaction from the blockchain network using the direct service provider account; and
   extracting, by the direct service provider device, the service execution result from the result return transaction.

16. The computer-implemented system according to claim 15, wherein the operations further comprises:
   before determining, by the indirect service provider device, the service execution result of the service:
      constructing, by the direct service provider device, a result acquisition transaction using the direct service provider account;
      submitting, by the direct service provider device, the result acquisition transaction to the blockchain network, wherein the result acquisition transaction comprises the service identifier of the service;
      triggering, by the blockchain network, a result acquisition event based on the result acquisition transaction; and
      writing, by the blockchain network, the result acquisition transaction to the blockchain.

17. The computer-implemented system according to claim 16, wherein determining, by the indirect service provider device, the service execution result of the service comprises:
   monitoring, by the indirect service provider device, the result acquisition event using the indirect service provider account;
   after detecting the result acquisition event, obtaining, by the indirect service provider device, the result acquisition transaction from the blockchain network using the indirect service provider account;
   extracting, by the indirect service provider device, the service identifier from the result acquisition transaction; and
   determining, by the indirect service provider device, the service execution result of the service based on the service identifier.

18. The computer-implemented system according to claim 16, wherein the operations further comprises:
   before triggering the result acquisition event, assigning, by the blockchain network, a first status flag to the result acquisition transaction, wherein the first status flag indicates that the indirect service provider device does not return the service execution result; and
   writing, by the blockchain network, the first status flag assigned to the result acquisition transaction to the blockchain.

19. The computer-implemented system according to claim 16, wherein the operations further comprises:
   before triggering the result return event, assigning, by the blockchain network, a second status flag to the result return transaction, wherein the second status flag indicates that the indirect service provider device has returned the service execution result; and
   writing, by the blockchain network, the second status flag assigned to the result return transaction to the blockchain.

20. The computer-implemented system according to claim 16, wherein the operations further comprises:
   after obtaining the service execution result in the result return transaction:
      constructing, by the direct service provider device, a confirmation transaction using the direct service provider account;
      submitting, by the direct service provider device, the confirmation transaction to the blockchain network, wherein the confirmation transaction comprises the service identifier;
      assigning, by the blockchain network, a third status flag to the confirmation transaction, wherein the third status flag indicates that the direct service provider device has obtained the service execution result; and
      writing, by the blockchain network, the third status flag assigned to the confirmation transaction to the blockchain.

* * * * *